United States Patent [19]

Toko

[11] Patent Number: 5,140,698
[45] Date of Patent: Aug. 18, 1992

[54] MOBILE TELEPHONE SYSTEM WITH INTERMITTENT CONTROL OF RECEIVER COMPONENTS IN STANDBY STATE

[75] Inventor: Yoshio Toko, Hyogo, Japan

[73] Assignee: Mitsubishi Denki Kabushiki Kaisha, Tokyo, Japan

[21] Appl. No.: 426,758

[22] Filed: Oct. 26, 1989

[30] Foreign Application Priority Data

Mar. 31, 1989 [JP] Japan .................. 1-82867

[51] Int. Cl.⁵ .................................... H04B 1/16
[52] U.S. Cl. ............................... 455/76; 340/825.44; 455/343
[58] Field of Search ............... 455/67, 76, 127, 226, 455/343; 340/825.44; 379/63

[56] References Cited

U.S. PATENT DOCUMENTS

| 4,663,623 | 5/1987 | Lax et al. ............... 340/825.44 |
| 4,794,649 | 12/1988 | Fujiwara .................. 455/9 |
| 4,903,319 | 2/1990 | Kasai et al. .............. 455/33 |
| 4,977,611 | 12/1990 | Maru ..................... 455/161 |

FOREIGN PATENT DOCUMENTS

| 0245024 | 11/1987 | European Pat. Off. . |
| 0279697 | 8/1988 | European Pat. Off. . |
| 0047345 | 3/1983 | Japan . |
| 0079526 | 3/1990 | Japan . |

Primary Examiner—Reinhard J. Eisenzopf
Assistant Examiner—Chi H. Pham
Attorney, Agent, or Firm—Rothwell, Figg, Ernst & Kurz

[57] ABSTRACT

A mobile telephone system having a controlling portion which sends an intermittent signal to a power switch during a standby state so that power is turned on during a period when a necessary signal portion of a control signal derived from a signal receiving portion is input, the power switch being turned off during a period when an unnecessary signal portion of the control signal is input, and thereby, the components of the signal receiving portion having short rise times, i.e., time intervals between turning on of the power source and start of operation, are supplied with intermittent power to reduce power consumption.

20 Claims, 9 Drawing Sheets

MOBILE TELEPHONE SYSTEM WITH INTERMITTENT CONTROL OF RECEIVER COMPONENTS IN STANDBY STATE

BACKGROUND OF THE INVENTION

1. Field of the Invention

The present invention relates to mobile telephones and more particularly to mobile telephones such as on-vehicle telephones for use in automobile telephone systems or the like, portable telephones, and on-vehicle portable telephones.

2. Description of the Prior Art

FIG. 1 is a block diagram showing a prior art frequency synthesizer for a mobile telephone described, for example, in the Transactions of National Conference of Institute of Electronics and Communication Engineers of Japan, Communications Section, Vol. No. 447, 1986, pp. 2-265. Referring to the figure, reference numeral 1 denotes a power source which is connected to a switch 2a for switching the power source 1 by receiving an intermittent signal output through intermittent control portion 60. 53 denotes a phase comparator for comparing phases of output signals from frequency dividers 58 and 59, and outputting an error signal to a charge pump 54. 55 denotes a loop filter through which the charge pump signal is transmitted to a voltage controlled oscillator (VCO) 56, 57 denotes a prescaler, 58 denotes a variable frequency divider for dividing an output signal of the prescaler 57, 59 denotes a reference frequency divider for generating a reference frequency, 60 denotes the intermittent control portion for controlling the intermittent signal, 61 denotes a zero-phase detector for detecting the instant the phase between the output signal of the prescaler 57 and the reference signal becomes zero, and 62 denotes an initial setting pulse generator for initializing the reference frequency divider 59 and the variable frequency divider 58.

Operation will be described below.

Generally, a frequency synthesizer includes a plurality of frequency dividers 58, 59, and when the loop is in a phase-locked state, the outputs of these frequency dividers 58, 59 are in synchronism at a certain phase difference. However, since the frequency dividers 58, 59 are each formed by a plurality of flip-flops, the relative phase between the outputs of the frequency dividers 58, 59 becomes unstable immediately after power is turned on again after the power has been turned off. Hence, a large error signal is outputted from the phase comparator 53 at this instant, whereby a frequency jump, that is, a momentary-great jump of the frequency of the VCO 56, occurs and makes signal reception impossible. To solve this problem, there have been devised various approaches both in software and hardware.

FIG. 2 shows the timing between a format of data received in a stand-by state and an intermittent signal controlling a frequency synthesizer in the U.S. 800 MHz band mobile radiotelephone system (EIA, IS - 19). According to standards in the system, in the standby state only A-words or only B-words may be read dependent on whether an even or odd telephone number has been assigned to the mobile telephone. Control words A and B are generated from a base station and instruct the controller to switch to a particular frequency dependent on various reception conditions. If the frequency jump period is not longer than 4.4 ms when power is turned on again by the intermittent signal being applied as shown in FIG. 2, there is no problem in receiving data. The design of hardware to satisfy the above described condition is indicated in FIG. 1. When power is turned on again, the instant the momentary phase between the output signal of the prescaler 57 and the reference signal becomes zero as detected by the zero-phase detector 61, the reference frequency divider 59 and variable frequency divider 58 are initialized by setting pulse generator 62, thereby preventing a large phase error signal. Meanwhile, the portion enclosed by one-dot chain line in FIG. 1, which is composed of a CMOS LSI, is continuously powered.

Since prior art mobile telephones are constructed as described above, a zero-phase detector 61 and a phase-locked loop with an intermittent operation controlling function have been used and the construction has therefore been complex and expensive. There have also been problems in that a frequency drift occurs when the phase-locked loop ceases operation and a large change in the frequency is caused specifically by vibration or the like. Further, since the signal receiving portion and the VCO, high-frequency amplifier, etc., of the frequency synthesizer are continuously powered, namely, operated without intermission, there has been a problem that power consumption has been excessively high.

SUMMARY OF THE INVENTION

The present invention is directed toward solving the above mentioned problems. Accordingly, an object of the present invention is to provide a mobile telephone which will achieve a reduced power consumption in the stand-by state while receiving the control signal and which will have a more stable frequency signal output from its frequency synthesizer.

The mobile telephone according to the present invention is so arranged that its controlling portion generates and outputs an intermittent signal corresponding to the control signal derived from the signal receiving portion, and the power switch delivers the voltage supplied from the power source to the power receiving portion and the frequency synthesizer according to this intermittent signal.

Other objects and features of the present invention will be more fully understood from the following description of preferred embodiments with reference to the accompanying drawings.

PREFERRED EMBODIMENTS OF THE INVENTION

Figure 3:
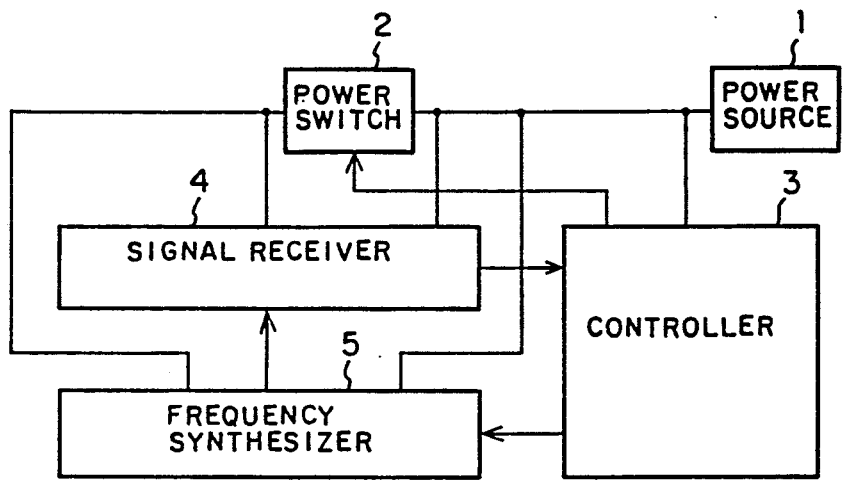
FIG. 3 is a block diagram showing a mobile telephone according to an embodiment of the present invention.

Preferred embodiments of the present invention will be described below with reference to the accompanying drawings. Referring to FIG. 3, reference numeral 1 denotes a power source, 2 denotes a power switch for turning the power on/off according to an intermittent signal, 3 denotes a controller for generating the intermittent signal, 4 denotes a signal receiver for receiving and demodulating a transmitted signal, and 5 denotes a frequency synthesizer for supplying the signal receiver 4 with a synchronized frequency.

Figure 4:
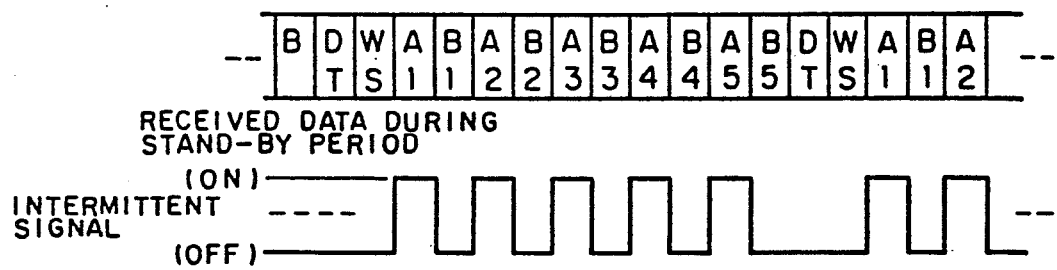
FIG. 4 is a timing chart showing relation between a control signal and an intermittent signal.
Figure 5:
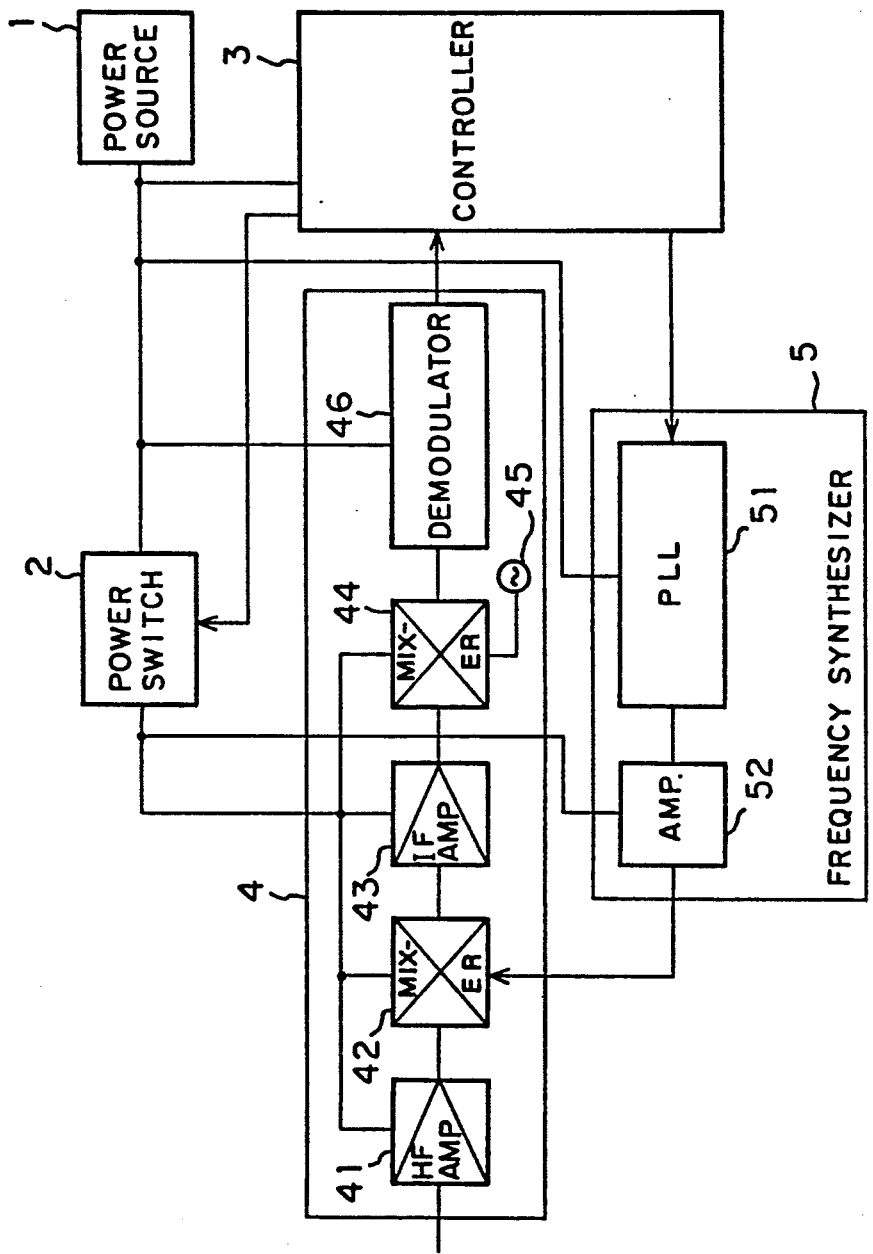
FIG. 5 is a block diagram showing a detailed structure of a signal receiving portion.

FIG. 5 is a block diagram showing a detailed structure of the signal receiver 4 which is a double superheterodyne type signal receiver. Reference numeral 41 denotes a high-frequency amplifier for amplifying a received signal from an antenna (not shown), 42 denotes a first mixer connected to the frequency synthesizer 5, 43 denotes a first intermediate-frequency amplifier for amplifying an output signal of the first mixer 42, 44 denotes a second mixer connected to the first intermediate-frequency amplifier 43 and to a second local oscillator 45. 46 denotes a demodulator for converting an output signal from the second mixer 44 into a digital signal. 51 denotes a phase-locked loop (hereinafter to be called "PLL") for generating a synchronization frequency signal under instructions from the controller 3, and 52 denotes a first local oscillation output amplifier (hereinafter to be called "amplifier") for amplifying the PLL synchronization frequency signal output from the PLL 51. FIG. 4 is a timing chart showing the relation between data received in a stand-by state (a control signal) and an intermittent signal in the U.S. 800 MHz band mobile radiotelephone system (EIA, IS-19) taken as an example. As previously described, the mobile telephone in a stand-by state may only receive and analyze either A-words or B-words according to the telephone number assigned thereto, and FIG. 4 shows the case where A words only may be received.

Operation will be described below. When an input electric field detector circuit (not shown) has detected an input electric field higher than a predetermined level, the mobile telephone comes into a stand-by state. Thereupon, the signal receiver 4 is rendered operative and a received signal is amplified by the high-frequency amplifier 41. Meanwhile, the frequency synthesizer 5 generates a frequency signal as instructed by the controller 3 by means of the PLL 51 and outputs the signal to the first mixer 42 after amplifying it through the amplifier 52. The first mixer 42 with the use of this frequency signal converts the amplified received signal into a first intermediate-frequency signal. This first intermediate-frequency amplifier signal is amplified by the first intermediate-frequency amplifier 43, and this amplified signal is mixed with a frequency signal output from the second local oscillator 45 in the second mixer 44, and thereby a baseband signal is obtained. This baseband signal is converted into a digital signal by the demodulator 46 and delivered to the controller 3. The controller 3 starts intermittent control upon detection of the pattern of DT (dotting) and WS (word sync) included in the received digital signal, namely, the control signal. Thereafter, the controlling portion 3 outputs an intermittent signal to the power switch 2 causing the same to be turned on only during periods when the A-word portions of the control signal are inputted as shown at the bottom of FIG. 4. The power switch 2 operates to turn off the power during the OFF periods of the intermittent signal so that the voltage of the power source 1 may not be applied to the high-frequency amplifier 41, first mixer 42, first intermediate-frequency amplifier 43, and second mixer 44 of the signal receiver 4 and the amplifier 52 of the frequency synthesizer 5. Hence, time constants of only these blocks affect the rise time of the output side of the power switch 2, on which the rise time of the PLL 51 has no bearing. Since the time constants of these blocks are not so large, the rise time can be kept to a minimum and the leading edge of the intermittent signal virtually coincides with the time point at which each block starts its operation. Hence, the controller 3 is enabled to receive the A-word portions without losing any part thereof. As a result, while the telephone is in the stand-by state, the periods of time when the blocks connected with the output side of the power switch 2 are powered amount to less than half of the entire period, and therefore, the power consumption by these blocks can be reduced to less than half.

Figure 6:
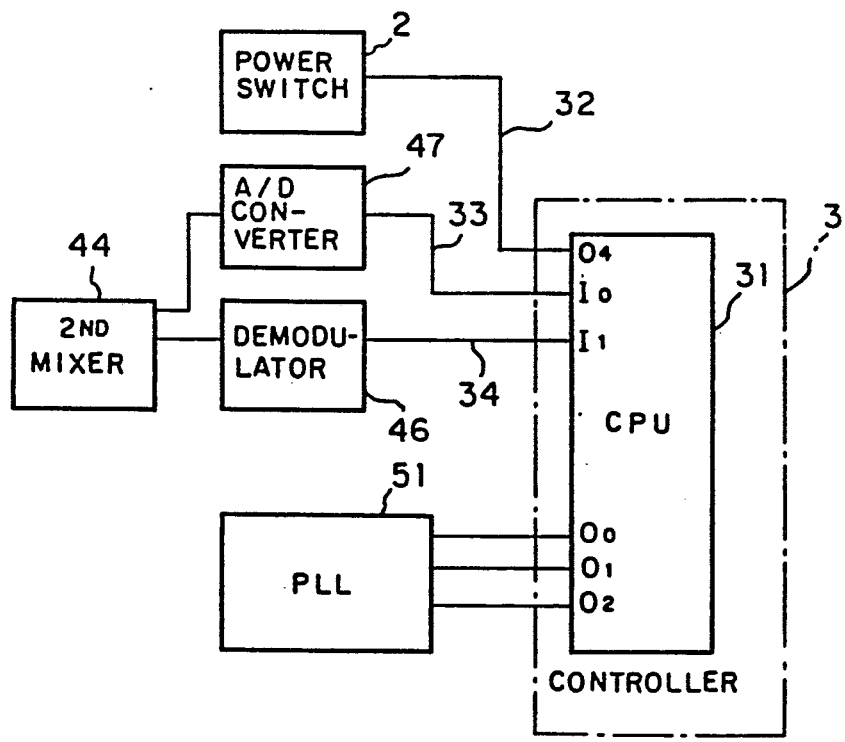
FIG. 6 is a block diagram showing a detailed structure of a controlling portion.

FIG. 6 is a block diagram showing a controller 3 composed of a microprocessor and its peripheral components. Reference numeral 31 denotes a central processing unit (CPU) including an input/output port, RAM, ROM, and timer, and 47 denotes an A/D converter for analog-to-digital conversion of the output of the second mixer 44. Reference numeral 32 denotes an output line carrying the intermittent signal (hereinafter to be simply called "intermittent signal"), 33 denotes an electric field detection signal line input to CPU 31, and 34 denotes a control signal line (hereinafter to be simply called "control signal").

Figure 7:
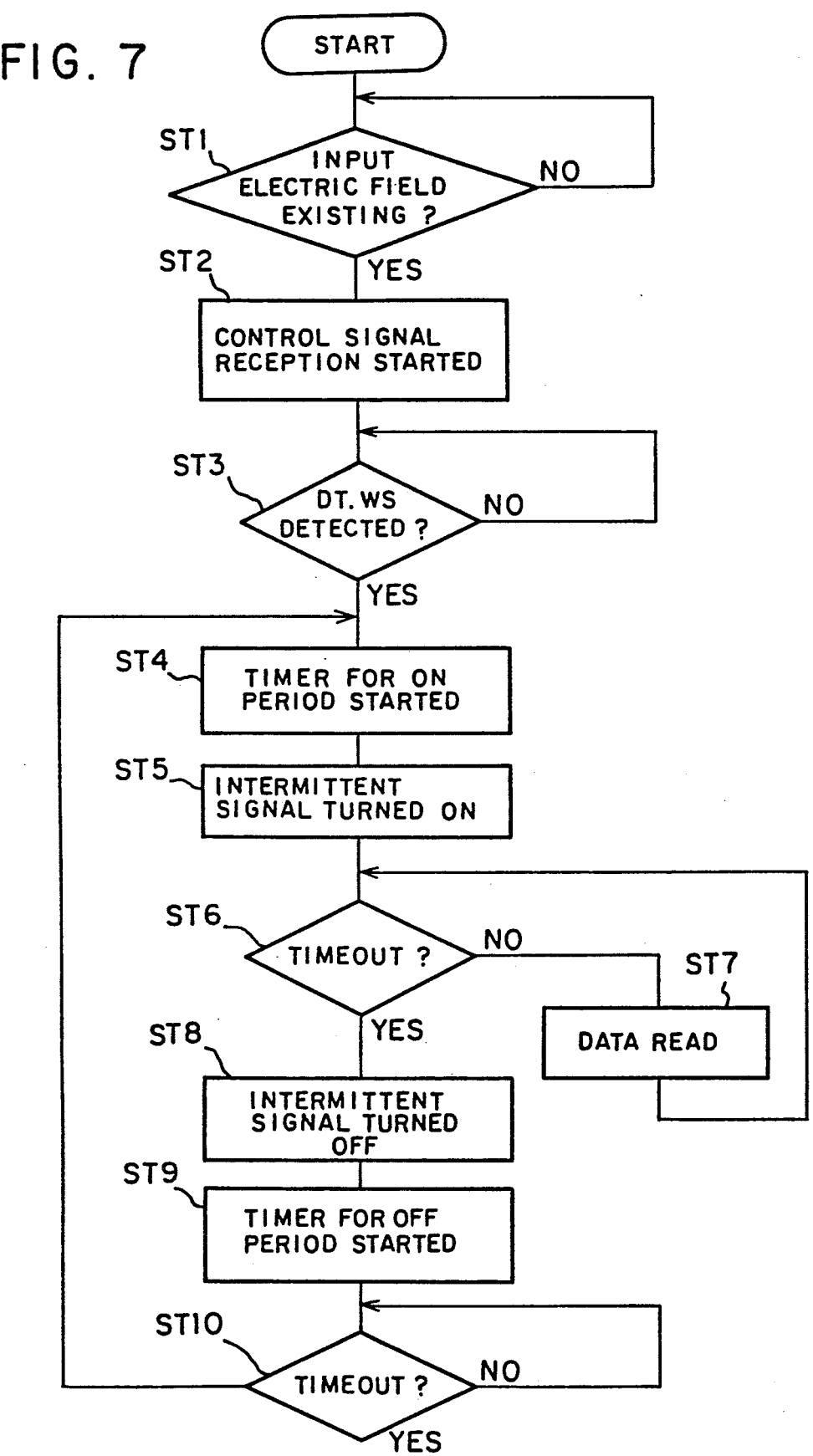
FIG. 7 is a flow chart showing operations in the controlling portion shown in FIG. 6.

Operations of the controller 3 will be described below with reference to a flow chart shown in FIG. 7. First, the CPU 31 reads the output 33 of the A/D converter 47 and determines, when the output is larger than a predetermined value, that an input electric field greater than a predetermined level is detected and thereupon enters into the stand-by state (step ST 1). In succession thereto, the CPU enters into the state to receive the control signal 34 (step ST 2), and starts the intermittent control upon detection of DT and WS in the control signal 34 received from the demodulator 46 (step ST 3). Here, it is assumed that the intermittent control receives A-words. Since A1-word comes immediately after WS, a timer of the CPU 31 is started (step ST 4). At the same time, the intermittent signal 32 is turned ON (step ST 5) and the CPU 31 receives the control signal 34 and analyzes the signal (step ST 7) until a timeout of the timer. When the timer has timed out (step ST 6), it is determined that the A-word period is over and the intermittent signal 32 is turned OFF (step ST 8). The timer is started again to determine the OFF period, the end of which corresponds to the starting timing of the next A-word period (step ST 9). The value of the time out period corresponds to the B-word period. When the timer is timed out (step ST 10), the sequence returns to the step ST 4, whereupon the intermittent signal 32 is turned ON. The controller thus performs intermittent control in the described way.

Figure 8:
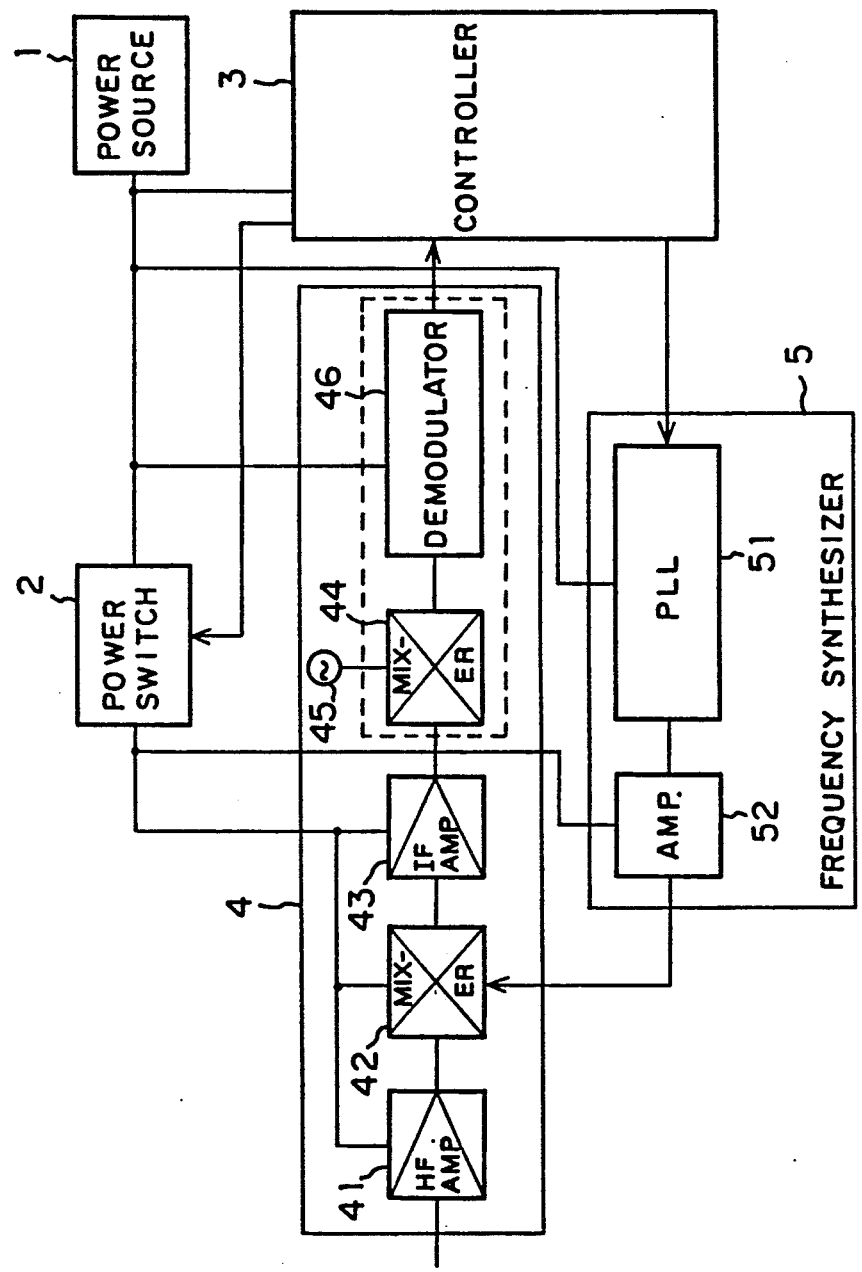
FIGS. 8 to 11 are block diagrams showing mobile telephones according to other embodiments of the present invention.

Although the second mixer 44 was included in the intermittent control in the embodiment described above, if the second mixer 44 and the demodulator 46 are accommodated by an IC as shown in FIG. 8, these can be arranged to be constantly powered.

Figure 9:
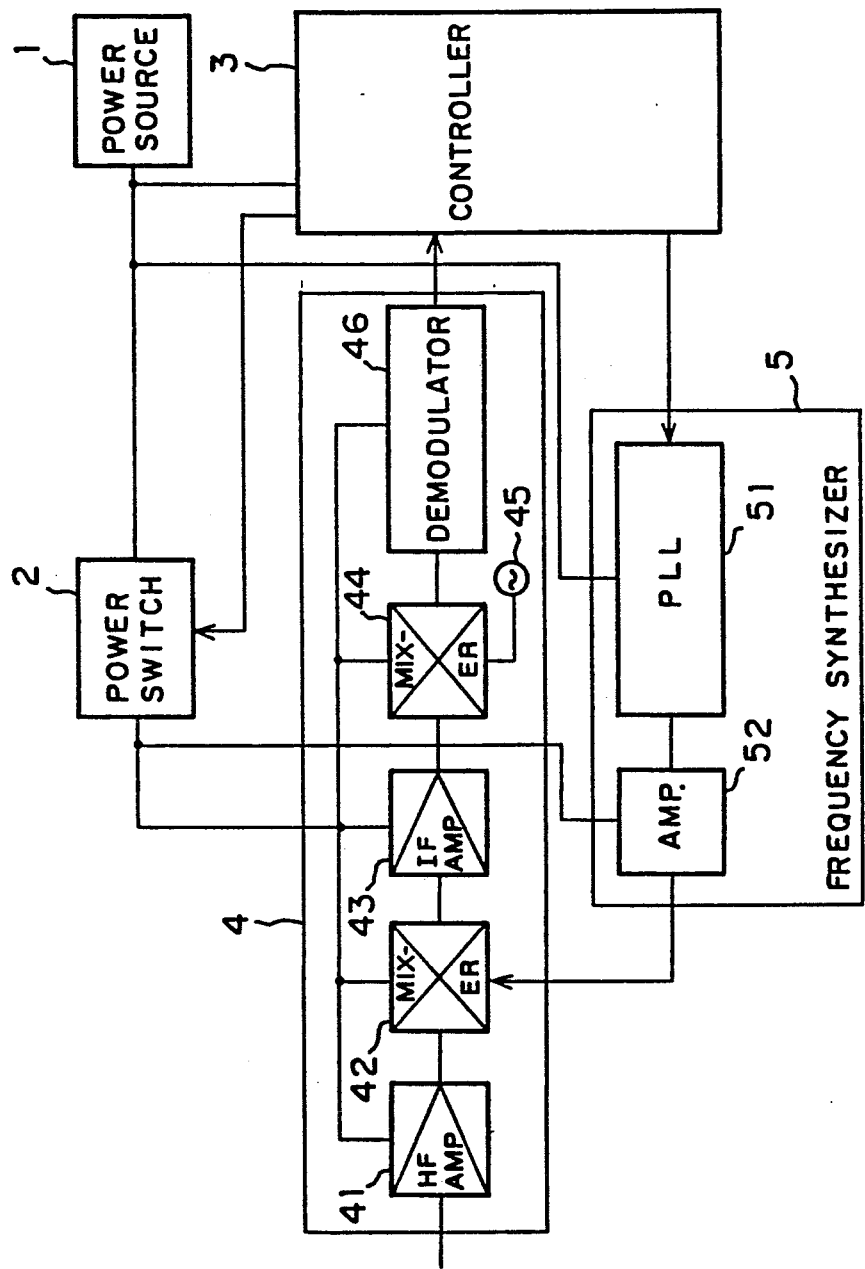

The demodulator 46 was not included in the intermittent control in the above described embodiment since the load capacity of the demodulator 46 is so large as to prolong the rise time of the power. However, if the ON timing of the intermittent signal 32 is somewhat advanced, intermittent control of the demodulator becomes possible. More particularly, the intermittent control of the blocks including the demodulator 46 can be achieved by setting a smaller value in the timer for the OFF period at step ST 9 in the flow chart of FIG. 7 to such a degree that the delay in the rise of the power source is compensated for, and by setting a greater value for the ON period at step ST 4, correspondingly. An arrangement to achieve such control is shown in FIG. 9.

Figure 10:
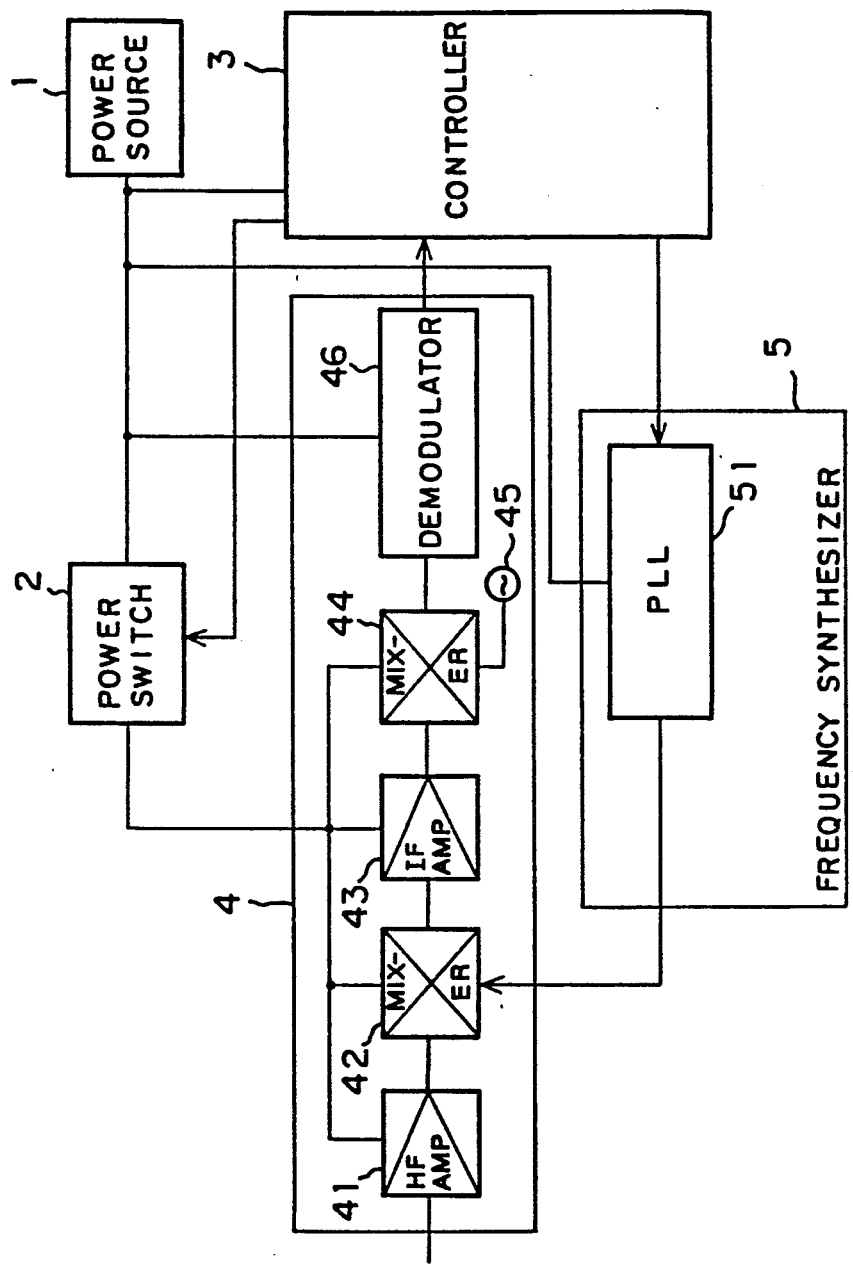

When the output level of the PLL 51 of the frequency synthesizer 5 is sufficiently high, it is possible to omit the amplifier 52 as shown in FIG. 10. At this time, the frequency synthesizer 5 is not included in the intermittent control. In the case of FIG. 10, the signal receiver 4 may also be arranged as shown in FIG. 8 or FIG. 9.

Figure 1:
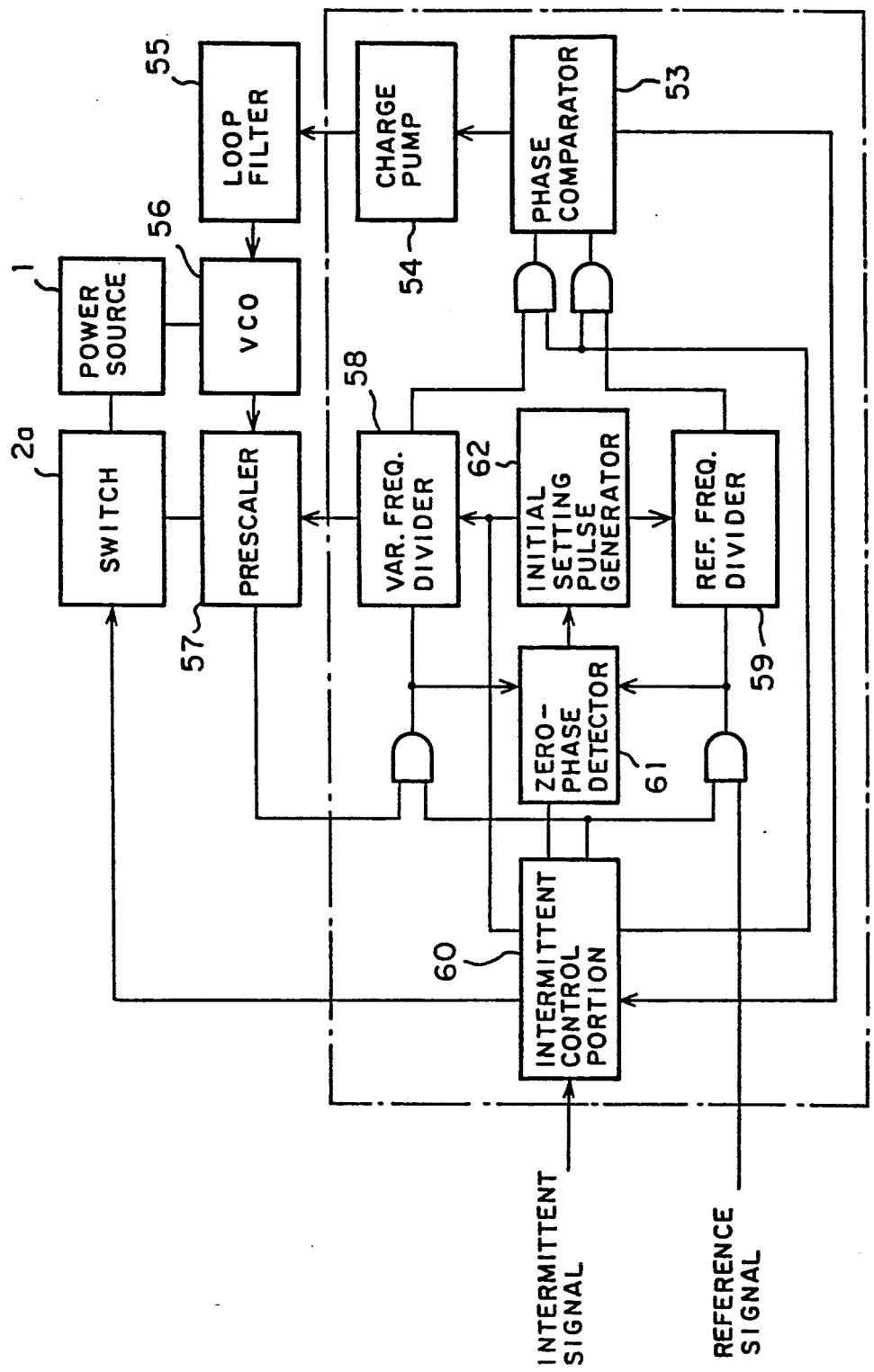
FIG. 1 is a block diagram showing a frequency synthesizer of a prior art mobile telephone.
Figure 2:
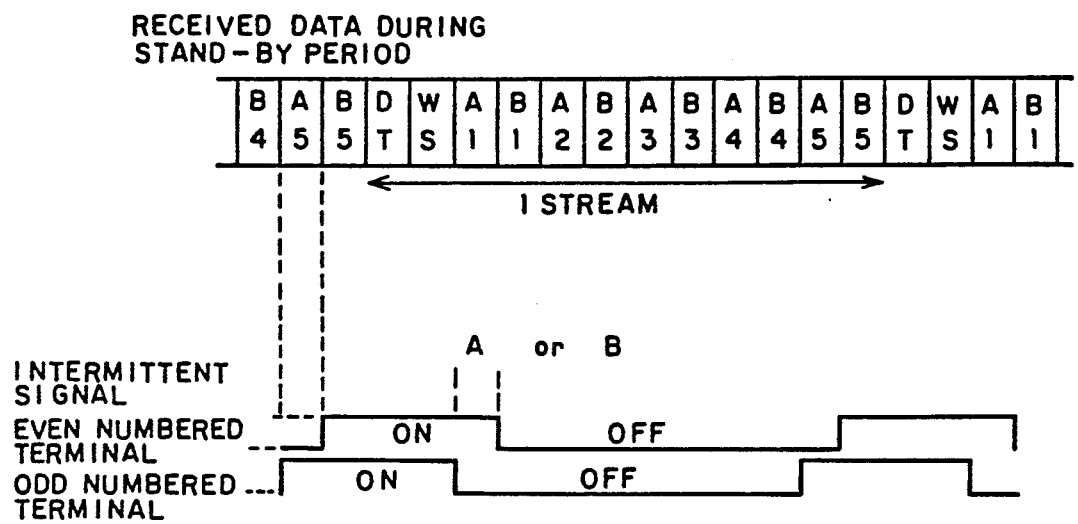
FIG. 2 is a timing chart showing relation between a control signal and an intermittent signal in the prior art.
Figure 11:
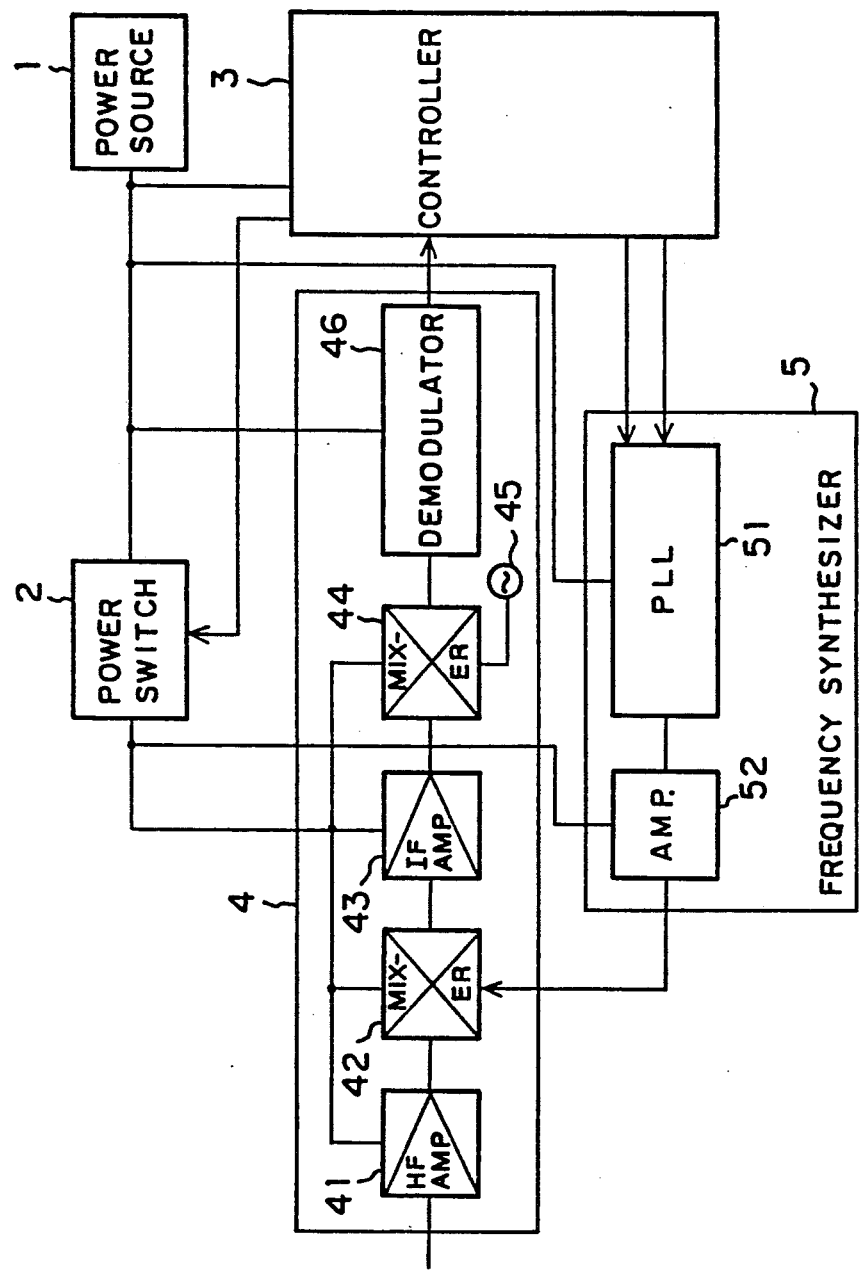

Although the PLL 51 was arranged to be constantly powered in the above described embodiments, if the same is arranged as shown in FIG. 1 and subjected to intermittent control by the controller 3 as shown in FIG. 11, the power consumption can be reduced further.

According to the present invention as described, since the mobile telephone is arranged such that power is intermittently supplied to a part of the controlling portion and a part of the frequency synthesizer while the telephone is in the stand-by state, the power consumption in the standby state can be reduced and a more stable frequency can be outputted from the frequency synthesizer compared to that provided with the prior art intermittent control.

What is claimed is:

1. A mobile telephone system comprising:
   signal receiver means for demodulating a received modulated signal, including an analog demodulating portion for demodulating a received modulated high-frequency signal into a baseband signal and a digital demodulating portion for demodulating said baseband signal into a digital signal, to output an audio signal or a control signal, said control signal being receivable only during intermittent intervals of a continuous stand-by period of said system;
   frequency synthesizer means, including a phase-locked loop, for generating a demodulating frequency signal and outputting the frequency signal to said signal receiver means;
   controller means for generating and outputting an intermittent signal synchronous with said control signal during said continuous stand-by period of said system, said controller means including a timer and program means for detecting a synchronization signal included in said control signal;
   said program means including timer setting means for setting up in said timer a first timer value corresponding to a period of said control signal during which a necessary signal is included in said control signal, at a time when a second timer value set in said timer has expired, said second timer value corresponding to a period of said control signal during which an unnecessary signal is included in said control signal;
   intermittent signal output means for rendering said intermittent signal nonactive when said first timer value has expired, and rendering said intermittent signal active when said second timer value has expired;
   a power source for applying a voltage continuously to at least said controller means; and
   a power switch responsive to said intermittent signal for outputting an intermittent voltage derived from said power source to said signal receiver means and components of said frequency synthesizer means other said phase-locked loop, such that power is switched on and off synchronously with intermittent reception of said control signal over said continuous stand-by period, and a continuous voltage is provided to said phase-locked loop to maintain frequency stability in said frequency synthesizer means regardless of the state of said intermittent signal.

2. A mobile telephone system according to claim 1, wherein said frequency synthesizer means further includes an amplifier for amplifying an output signal of said phase-locked loop.

3. A mobile telephone system according to claim 2, wherein said power switch includes an output line connected with said analog demodulating portion and said amplifier.

4. A mobile telephone system according to claim 3, wherein said output line of said power switch is further connected to said digital demodulating portion.

5. A mobile telephone system according to claim 3, wherein said power switch includes a switching element receiving said intermittent signal as a control signal for outputting a voltage derived from said power source to said output line when said intermittent signal is active.

6. A mobile telephone system according to claim 1, wherein said analog demodulating portion includes an integrated circuit having a mixer for outputting a baseband signal to said digital demodulating portion.

7. A mobile telephone system according to claim 6, wherein said frequency synthesizer means further includes an amplifier for amplifying an output signal of said phase-locked loop.

8. A mobile telephone system according to claim 7, wherein said power switch includes an output line connected with a portion of said analog demodulating portion including said amplifier and excluding said mixer.

9. A mobile telephone system according to claim 8, wherein said power switch includes a switching element receiving said intermittent signal as a control signal for outputting a voltage derived from said power source to said output line when said intermittent signal is active.

10. A mobile telephone system according to claim 8, wherein said output line of said power switch is further connected to said digital demodulating portion.

11. A mobile telephone system according to claim 6, wherein said power switch includes an output line connected with a portion of said analog demodulating portion excluding said mixer.

12. A mobile telephone system according to claim 11, wherein said power switch includes a switching element receiving said intermittent signal as a control signal for outputting a voltage derived from said power source to said output line when said intermittent signal is active.

13. A mobile telephone system according to claim 12, wherein said output line of said power switch is further connected to said digital demodulating portion.

14. A mobile telephone system according to claim 11, wherein said output line of said power switch is further connected to said digital demodulating portion.

15. A mobile telephone system according to claim 1, wherein said power switch includes an output line connected with said analog demodulating portion.

16. A mobile telephone system according to claim 15, wherein said power switch includes a switching element receiving said intermittent signal as a control signal for outputting a voltage derived from said power source to said output line when said intermittent signal is active.

17. A mobile telephone system according to claim 16, wherein said output line of said power switch is further connected to said digital demodulating portion.

18. A mobile telephone system according to claim 15, wherein said output line of said power switch is further connected to said digital demodulating portion.

19. A mobile telephone system according to claim 15, wherein said analog demodulating portion includes an A/D converter for analog-to-digital converting an output of said mixer and outputting the converted signal to said central processing unit.

20. A mobile telephone system according to claim 1, wherein said timer setting means includes in said first timer value a value for compensating for a delay in a rise time of the output voltage of said power switch caused by said digital demodulating portion.

* * * * *